United States Patent [19]

Matsushima

[11] Patent Number: 4,855,003

[45] Date of Patent: Aug. 8, 1989

[54] APPARATUS FOR FIXING PROTECTIVE MOLDINGS TO VEHICLE BODIES

[75] Inventor: Eiji Matsushima, Hiroshima, Japan

[73] Assignee: Mazda Motor Corporation, Hiroshima, Japan

[21] Appl. No.: 167,894

[22] Filed: Mar. 14, 1988

[30] Foreign Application Priority Data

Mar. 14, 1987 [JP] Japan .................. 62/37783[U]

[51] Int. Cl.$^4$ ............................................. G05G 15/00
[52] U.S. Cl. ........................................ 156/358; 156/360
[58] Field of Search ............... 156/358, 360, 468, 522, 156/523, 574

[56] References Cited

U.S. PATENT DOCUMENTS

| 3,975,226 | 8/1976 | Boetteher | 156/358 |
| 4,060,442 | 11/1977 | Marchetti | 156/358 |
| 4,264,394 | 4/1981 | Izumihara | 156/358 |

FOREIGN PATENT DOCUMENTS 59-113334  1/1983  Japan .

*Primary Examiner*—David Simmons
*Attorney, Agent, or Firm*—Gerald J. Ferguson, Jr.

[57] ABSTRACT

An apparatus for fixing a protective molding to a vehicle body comprises a pressure device for pressing the protective molding attached temporarily to a side portion of the vehicle body against the vehicle body, a backward driving device for causing the pressure device to make a backward movement in relation to the vehicle body, a forward driving means for causing the pressure device to contact and press the protective molding, a body detecting device for coming into contact with the vehicle body before the pressure device contacts the vehicle body, and a control device for actuating the backward driving device to move the pressure device backward when the body detecting device contacts the vehicle device and then actuating the forward driving device to cause the pressure device which has been moved backward to contact the vehicle body and press the protective molding against the vehicle body.

19 Claims, 2 Drawing Sheets

APPARATUS FOR FIXING PROTECTIVE MOLDINGS TO VEHICLE BODIES

BACKGROUND OF THE INVENTION

1. Field of the Invention

The present invention relates generally to apparatus for fixing protective moldings to vehicle bodies, and more particularly, an apparatus for fixing a protective molding to a side portion of a vehicle body by means of pressing the protective molding which is attached temporarily to the side portion of the vehicle body against the vehicle body.

2. Description of the Prior Art

There has been proposed a vehicle body having its side portions on which protective moldings are mounted for lessening scraped damages inflicted on the side portions of the vehicle body. In a process usually taken for mounting the protective molding on the side portion of the vehicle body, the protective molding is first attached temporarily to the side portion of the vehicle body which is conveyed along an automatic assembly line and then pressed against the vehicle body by a pressure roller so as to be fixed to the side portion of the vehicle body, as disclosed in, for example, the Japanese utility model application published before examination under publication number 59/113334.

In the mounting of the protective molding thus carried out, the pressure roller used for fixing the protective molding to the side portion of the vehicle body is supported to be rotatable freely by an arm member which is disposed to extend toward the vehicle body generally in a direction at a predetermined angle, for example, an angle of thirty degrees or more, to a direction of conveyance of the vehicle body. On the occasion of fixing of the protective molding, the pressure roller supported by the arm member first comes into contact with a front end of a front bumper mounted on the vehicle body which is conveyed on the automatic assembly line and then is rotated in contact successively with the front end of the front bumper, a side end of the front bumper and the side portion of the vehicle body with the forward movement of the vehicle body so as to press the protective molding which is attached temporarily on the side portion of the vehicle body against the vehicle body.

In such fixing of the protective molding, for the purpose of having the protective molding fixed securely, it is considered to increase the pressure applied to the protective molding by the pressure roller. However, when the pressure applied to the protective molding by the pressure roller is increased, a relatively large force acts upon the arm member when the pressure roller operates to press the protective molding against the vehicle body and thereby it is feared that the arm member is undesirably bent.

In the case where the rigidity of the arm member is increased so as to be prevented from bending, it necessarily follows that the weight of the arm member is increased. This results in that the pressure roller being moved with increased inertia to the side portion of the vehicle body from the side end of the front bumper at a difference in level of surface between the side end of the front bumper and the side portion of the vehicle body which is being conveyed so as to give a severe blow to the side portion of the vehicle body and thereby a problem that the side portion of the vehicle body may be damaged.

OBJECTS AND SUMMARY OF THE INVENTION

Accordingly, it is an object of the present invention to provide an apparatus for fixing a protective molding to a vehicle body which avoids the foregoing disadvantage or problem encountered with the prior art.

Another object of the present invention is to provide an apparatus for fixing a protective molding to a vehicle body, which is provided with a pressure device by which the protective molding attached temporarily to a side portion of the vehicle body is pressed against the vehicle body to be surely fixed to the side portion of the vehicle body, and in which the pressure device is prevented from damaging the side portion of the vehicle body.

A further object of the present invention is to provide an apparatus for fixing a protective molding to a vehicle body, which is provided with a pressure roller supported by an arm member disposed to extend toward the vehicle body by which the protective molding attached temporarily to a side portion of the vehicle body is pressed against the vehicle body to be surely fixed to the side portion of the vehicle body, and in which the pressure roller is prevented from making an undesirable mark on the side portion of the vehicle body.

According to the present invention, there is provided an apparatus for fixing a protective molding to a vehicle body, which comprises a pressure device for coming into contact with the protective molding attached temporarily to a side portion of the vehicle body to press the protective molding against the vehicle body when the vehicle body is conveyed along a predetermined path, a backward driving device for causing the pressure device to make a backward movement in relation to the vehicle body, a forward driving device for causing the pressure device to contact and press the protective molding, a body detecting device provided to accompany with the pressure device for coming into contact with the vehicle body before the pressure device contacts the vehicle body, and a control device for actuating the backward driving device to move the pressure device backward when the body detecting device comes into contact with the vehicle body and then actuating the forward driving device to cause the pressure device which has been moved backward by the backward driving device to contact the vehicle body and press the protective molding attached temporarily to the side portion of the vehicle body against the vehicle body.

In the apparatus thus constituted in accordance with the present invention, the body detecting device comes into contact with the vehicle body before the pressure device contacts the vehicle body when, the vehicle body is conveyed. The pressure device is at once moved backward in relation to the vehicle body when the body detecting device comes into contact with the vehicle body, and then caused to contact the vehicle body. After that, the pressure device on the vehicle body comes into contact with the protective molding which is attached temporarily to the side portion of the vehicle body and is operative to press the protective molding against the vehicle body with pressure sufficiently increased by the control device, so that the protector molding is fixed surely to the side portion of the vehicle body.

In the case where the protective molding is fixed to the vehicle body by the apparatus according to the present invention in such a manner as described above, even if the pressure applied to the protective molding by the pressure device is set relatively large in order to have the protective molding fixed surely to the side portion of the vehicle body, the pressure device is prevented from giving a severe blow to the side portion of the vehicle body at a difference in level of surface formed on the side portion of the vehicle body, so that the side portion of the vehicle body is not damaged.

The above, and other objects, features and advantages of the present invention will become apparent from the following detailed description which is to be read in conjunction with the accompanying drawings.

BRIEF DESCRIPTION OF THE DRAWINGS

FIG. 3 is a schematic illustration showing equivalently a part of an air passage system employed in the embodiment shown in FIG. 1, which includes an air cylinder, a switching valve and an air pump.

DESCRIPTION OF THE PREFERRED EMBODIMENT

The invention will now be described by way of example with reference to the accompanying drawings.

Figure 1:
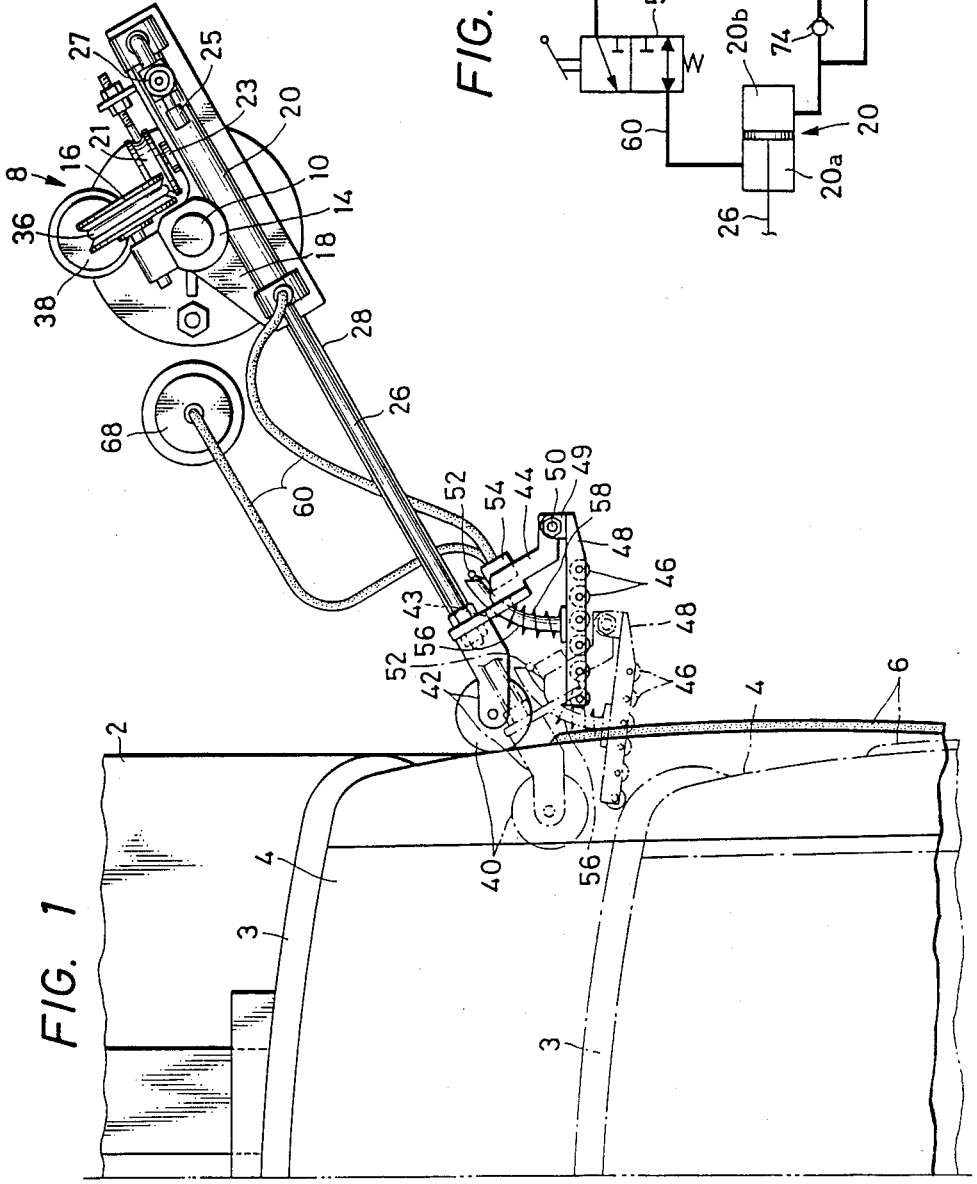
FIG. 1 is a schematic plan view showing one embodiment of apparatus for fixing a protective molding to a vehicle body according to the present invention, together with a part of a vehicle body to which a protective molding is fixed by the apparatus.
Figure 2:
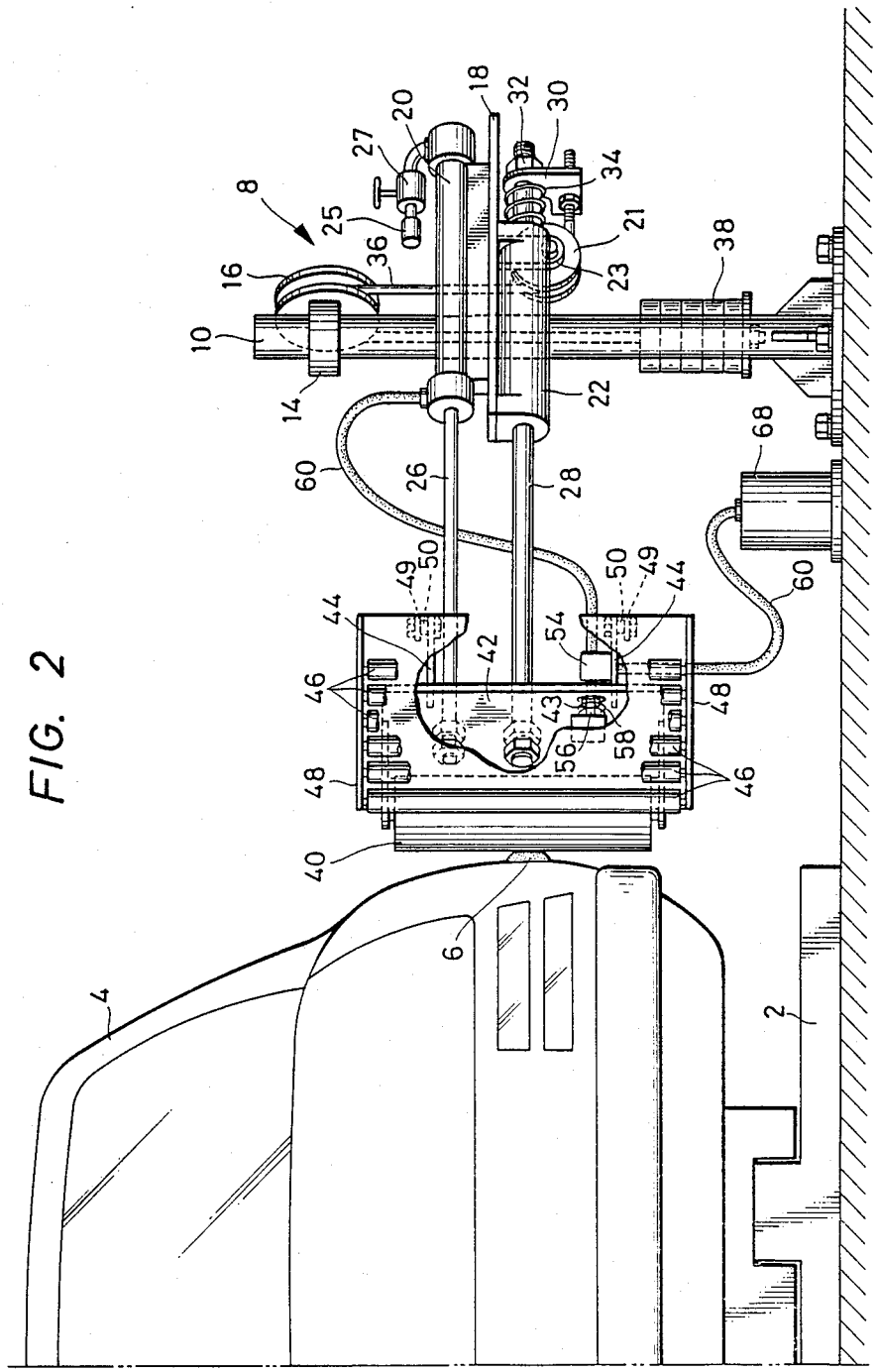
FIG. 2 is a schematic side view showing the embodiment and the part of the vehicle body shown in FIG. 1.

FIGS. 1 and 2 show one embodiment of apparatus for fixing a protective molding to a vehicle body according to the present invention and a part of a vehicle body provided thereon with a protective molding to be fixed by the apparatus.

Referring to FIGS. 1 and 2, a conveyor 2 on which a vehicle body 4 is placed is installed in a vehicle body assembly line to convey the vehicle body 4 along a predetermined path. The vehicle body 4 is provided with a front bumper 3 mounted on its front end and a protective molding 6 attached temporarily to its side portion. A protective molding fixing apparatus 8, which constitutes one example of the apparatus according to the present invention, is located in the vicinity of the conveyor 2 for pressing the protective molding 6 attached temporarily to the side portion of the vehicle body 4. Although only one protective molding fixing apparatus 8 is shown in FIGS. 1 and 2, a pair of protective molding fixing apparatus 8 which have the same configuration are actually located on both sides of the conveyor 2 for pressing the protective moldings 6 on both of the left and right side portions of the vehicle body 4.

The protective molding fixing apparatus 8 includes a fixed support 10 standing apart by a predetermined short distance from the conveyor 2. The fixed support 10 is provided near its top end with a holding member 14 for holding a shaft of a pulley 16 and also provided at its middle portion with a supporting plate member 18 having upper and under surfaces on which an air cylinder 20 and a tubular member 22 are mounted respectively. The supporting plate member 18 is further supplied with a bracket 23 fixed thereto for holding a shaft of a pulley 21.

The air cylinder 20 is provided with a piston rod 26 inserted therein to extend from a front end portion thereof toward the conveyor 2. A rear end portion of the air cylinder 20 is coupled with an air releasing pipe 25 on which a variable throttle valve device 27 is provided.

An arm member 28 is supported by the tubular member 22 with its rear portion inserted into the tubular member 22 to pass therethrough movably in a longitudinal direction. A bracket 30 is mounted on a rear end portion of the arm member 28 extending backward from the tubular member 22 with a coil spring 34 compressed between the rear end of the tubular member 22 and the bracket 30 for causing the arm member 28 to tend to move away from the conveyor 2 and a nut 32 engaging with the bracket 30 to stop the same on the rear end portion of the arm member 28. One end of a wire 36 engaging with the pulleys 16 and 21 is fastened to the bracket 30 and the other end of the wire 36 is provided with a weight 38 hung therefrom, so that the gravity of the weight 38 acts through the wire 36 and the bracket 30 upon the arm member 28 and thereby the arm member 28 tends to move against the elastic force affected by the coil spring 34 toward the conveyor 2.

A pressure roller supporting member 42 is attached to both front ends of the piston rod 26 and the arm member 28, and a pressure roller 40 is supported by the pressure roller supporting member 42 with a shaft extending vertically to be rotatable freely for pressing the protective molding 6 attached temporarily to the side portion of the vehicle body 4. To the pressure roller supporting member 42, a pair of brackets 44 are fixed to be arranged vertically for holding a guide roller supporting member 48 by which a plurality of guide rollers 46 are supported to be rotatable. The guide roller supporting member 48 is coupled with the brackets 44 through pins 50 fixed on brackets 49 respectively to be movable rotatably on a rotation axis constituted by the pins 50.

A switching valve 54 provided with a control lever 52 is fixed to one of the brackets 44 which is positioned to be lower, and in relation to the control lever 52, a pushing rod 56 which is curved in a horizontal plane perpendicular to the shaft of the pressure roller 40 is provided with its one end fixed to a surface of the guide roller supporting member 48 facing the pressure roller supporting member 42. The pushing rod 56 is so selected in position that the other end of the pushing rod 56 is moved together with the guide roller supporting member 48 rotating on the rotation axis constituted by the pins 50 through a opening 43 formed on the pressure roller supporting member 42 so as to push the control lever 52 provided to the switching valve 54. Between the pressure roller supporting member 42 and the guide roller supporting member 48, a coil spring 58 is compressed for causing the guide roller supporting member 48 to tend to rotate in such a direction that the other end of the pushing rod 56 is moved away from the control lever 52 provided to the switching valve 54.

The switching valve 54 is provided in the middle of an air pipe 60 with one end thereof connected to a front end of the air cylinder 20 and the other end thereof connected to an air pump 68.

FIG. 3 shows equivalently an air passage system including the air cylinder 20, the switching valve 54 and the air pump 68. Referring to FIG. 3, the air cylinder 20 is provided with a couple of air chambers 20a and 20b partitioned by a piston head contained therein to be slidable. The one end of the air pipe 60 is coupled with the air chamber 20a and the air releasing pipe 25 is coupled with the air chamber 20b. The air releasing pipe 25 is provided with a check valve 72 which is operative only to allow the air in the air chamber 20b to be released into the atmosphere and a check valve 74 which is arranged in series to the variable throttle valve device 27 and operative only to allow the air to be brought into the air chamber 20b.

The switching valve 54 changes its valve position in response to an operational movement of the control lever 52 so that the air pipe 60 is opened to bring the air from the air pump 68 into the air chamber 20a of the air cylinder 20 when the control lever 52 is operated and the air chamber 20a is cut off from the air pump 68 and opened to the atmosphere when the control lever 52 is in an inoperative state.

With the arrangement mentioned above, the embodiment operates to fix the protective molding 6 attached temporarily to the side portion of the vehicle body 4 surely to the vehicle body 4 which is put on the conveyor 2 to be conveyed as follows.

First, the arm member 28 is operated to cause the pressure roller supporting member 42 and the guide roller supporting member 48 to be positioned above the conveyor 2 as shown with dot-dash lines in FIG. 1. Then, when the front bumper 3 mounted on the vehicle body 4 comes into contact with the guide rollers 46 supported by the guide roller supporting member 48, the guide roller supporting member 48 is rotated on the rotation axis constituted by the pins 50 in relation to the bracket 44 and thereby the pushing rod 56 is moved against the elastic force affected by the coil spring 58 to push the control lever 52 of the switching valve 54.

In response to the movement of the control lever 52 pushed by the pushing rod 56, the valve position in the switching valve 54 is shifted so that the air from the air pump 68 is brought through the air pipe 60 into the air chamber 20a of the air cylinder 20 and the air in the air chamber 20b is released through the check valve 72 and the air releasing pipe 25 into the atmosphere. Consequently, the pressure in the air chamber 20a of the air cylinder 20 is increased and thereby the piston rod 26 is pulled into the air cylinder 20 to cause the pressure roller 40 supported by the pressure roller supporting member 42 and the guide rollers 46 supported by the guide roller supporting member 48 to move backward and simultaneously the arm member 28 is moved backward through the tubular member 22 against the effect of the weight 38.

Such backward movements of the pressure roller 40 and the guide rollers 46 result in reduction of the force acting upon the arm member 28 in a direction of conveyance of the vehicle body 4.

When the piston rod 26 and arm member 28 accompanied with the pressure roller supporting member 42 and the guide roller supporting member 48 are thus pulled back, the guide rollers 46 are moved back to be away from the vehicle body 4 and the guide roller supporting member 48 is rotated on the rotation axis constituted by the pins 50 in relation to the bracket 44 by the elastic force affected by the coil spring 58, so that the control lever 52 of the switching valve 54 is released from the engagement with the pushing rod 56 to return to an inoperative position. As a result, the valve position in the switching valve 54 is shifted again so that the air from the air pump 68 is prevented from being brought into the air chamber 20a of the air cylinder 20 and the gravity of the weight 38 acts through the wire 36 upon the arm member 28.

In such a condition, the pressure roller 40 is caused to come into contact with a side end of the front bumper 3 mounted on the vehicle body 4 which is conveyed by the conveyor 2 and then is rotated to contact successively with the side end of the front bumper 3 and the side portion of the vehicle body 4, as shown in FIG. 1, with the forward movement of the vehicle body 4 by the conveyor 2. When the pressure roller 40 is shifted from the side end of the front bumper 3 to the side portion of the vehicle body 4 at a difference in level of surface between the side end of the front bumper 3 and the side portion of the vehicle body 4, the piston rod 26 is required to extend toward the side portion of the vehicle body 4 together with the pressure roller 40. In such a case, an air mass flow to the air chamber 20b through the air releasing pipe 25 from the atmosphere is limited to be relatively small by the variable throttle valve device 27, so that the piston rod 26 moves forward to extend toward the side portion of the vehicle body 4 at a relatively low moving speed. Therefore, the pressure roller 40 comes into contact gently with the side portion of the vehicle body 4 without giving a severe blow to the same and consequently the side portion of the vehicle body 4 is not damaged.

After that, as shown in FIG. 2, the pressure roller 40 comes into contact with the protective molding 6 which is attached temporarily to the side portion of the vehicle body 4 and is operative to press the protective molding 6 against the vehicle body 4 with the pressure sufficiently increased by the arm member 28 on which the weight 38 acts through the wire 36, so that the protector molding 6 is securely fixed to the side portion of the vehicle body 4.

In the embodiment described above, the force acting upon the arm member 28 against the gravity of the weight 38 when the guide rollers 46 come into contact with the front end of the front bumper 3 can be controlled to be appropriate in response to the gravity of the weight 38 by means of varying an air pressure from the air pump 68 applied to the air chamber 20a of the air cylinder 20.

What is claimed is:

1. An apparatus for fixing a protective molding at a vehicle body, the apparatus comprising:
    pressure for coming into contact with the protective molding attached temporarily to a side portion of the vehicle body to press the protective molding against the vehicle body when the vehicle body is conveyed along a predetermined path,
    backward driving means for causing said pressure means to make a backward movement in relation to the vehicle body,
    forward driving means for causing said pressure means to contact and press the protective molding,
    body detecting means provided to accompany with said pressure means for coming into contact with the vehicle body before said pressure means contacts the vehicle body,
    control means for actuating said backward driving means to move said pressure means backward when said body detecting means comes into contact with the vehicle body and then actuating said forward driving means to cause said pressure means which has been moved backward by said backward driving means to contact the vehicle body and press the protective molding attached temporarily to the side portion of the vehicle body against the vehicle body, and movement adjusting means operative to keep a movement of said pressure means toward the vehicle body at a relatively low moving speed during a period of time in which said control means actuates said forward driving means to cause the pressure means to contact the vehicle body.

2. An apparatus according to claim 1, wherein said pressure means comprises an arm member supported by a fixed support to be movable forward and backward in relation to the vehicle body and a pressure roller attached to be rotatable to one end portion of said arm member for pressing the protective molding.

3. An apparatus according to claim 1, wherein said backward driving means comprises a cylinder supported by a fixed support and having a piston rod connected at its one end to said pressure means.

4. An apparatus according to claim 3, wherein said control means comprises a switching valve device operative to change a valve position therein for causing said cylinder to pull the piston rod back in order to move said pressure means backward when said body detecting means comes into contact with the vehicle body and for causing said cylinder to push the piston rod out in order to make said pressure means press the protective molding after said pressure means has been moved backward.

5. An apparatus according to claim 4, wherein said movement adjusting means comprises a throttle valve device incorporated with said backward driving means and operative to supply said cylinder with operating fluid so as to cause the piston rod to move at a relatively slow speed when said cylinder pushes the piston rod out.

6. An apparatus for fixing a protective molding to a vehicle body comprises:

pressure means for coming into contact with the protective molding attached temporarily to a side portion of the vehicle body to press the protective molding against the vehicle body when the vehicle body is conveyed along a predetermined path, backward driving means for causing said pressure means to make a backward movement in relation to the vehicle body, forward driving means for causing said pressure means to contact and press the protective molding, body detecting means provided to accompany with said pressure means for coming into contact with the vehicle body before said pressure means contacts the vehicle body, and control means for actuating said backward driving means to move said pressure means backward when said body detecting means comes into contact with the vehicle body and then actuating said forward driving means to cause said pressure means which has been moved backward by said backward driving means to contact the vehicle body and press the protective molding attached temporarily to the side portion of the vehicle body against the vehicle body, wherein said forward driving means comprises a weight connected through a wire to said pressure means and at east one pulley mounted on a fixed support for engaging with said wire.

7. An apparatus according to claim 6, wherein said pressure means comprises an arm member supported by a fixed support to be movable forward and backward in relation to the vehicle body and a pressure roller attached to be rotatable to one end portion of said arm member for pressing the protective molding.

8. An apparatus according to claim 6 further comprises movement adjusting means incorporated with said backward driving means and operative to keep a movement of said pressure means toward the vehicle body at a relatively low moving speed during a period of time in which said control means actuates said forward driving means to cause the pressure means to contact the vehicle body.

9. An apparatus according to claim 6, wherein said backward driving means comprises a cylinder supported by a fixed support and having a piston rod connected at its one end to said pressure means.

10. An apparatus according to claim 9, wherein said control means comprises a switching device operative to change a valve position therein for causing said cylinder to pull the piston rod back in order to move said pressure means backward when said body detecting means comes into contact with the vehicle body and for causing said cylinder to push the piston rod out in order to make said pressure means press the protective molding after said pressure means has been moved backward.

11. An apparatus according to claim 10, further comprises movement adjusting means incorporated with said backward driving means and operative to keep a movement of said pressure means toward the vehicle body at a relatively low moving speed during a period of time in which said control means actuates said forward driving means to cause the pressure means to contact the vehicle body.

12. An apparatus for fixing a protective molding at a vehicle body, the apparatus comprising:

pressure means for coming into contact with the protective molding attached temporarily to a side portion of the vehicle body to press the protective molding against the vehicle body when the vehicle body is conveyed along a predetermined path, backward driving means for causing said pressure means to make a backward movement in relation to the vehicle body, forward driving means for causing said pressure means to contact and press the protective molding, body detecting means provided to accompany with said pressure means for coming into contact with the vehicle body before said pressure means contacts the vehicle body, control means for actuating said backward driving means to move said pressure means backward when said body detecting means comes into contact with the vehicle body and then actuating said forward driving means to cause said pressure means which has been moved backward by said backward driving means to contact the vehicle body and press the protective molding attached temporarily to the side portion of the vehicle body against the vehicle body, wherein said body detecting means comprises a roller supporting member attached to be movable rotatably to said pressure means and a guide roller supported to be rotatable freely by said roller supporting member.

13. An apparatus according to claim 12, wherein said pressure means comprises an arm member supported by a fixed support to be movable forward and backward in relation to the vehicle body and a pressure roller attached to be rotatable to one end portion of said arm member for pressing the protective molding.

14. An apparatus according to claim 12 further comprises movement adjusting means incorporated with said backward driving means and operative to keep a movement of said pressure means toward the vehicle body at a relatively low moving speed during a period of time in which said control means actuates said forward driving means to cause the pressure means to contact the vehicle body.

15. An apparatus according to claim 12, wherein said backward driving means comprises a cylinder supported by a fixed support and having a piston rod connected at its one end to said pressure means.

16. An apparatus according to claim 15, wherein said control means comprises a switching valve device operative to change a valve position therein for causing said cylinder to pull the piston rod back in order to move said pressure means backward when said body detecting means comes into contact with the vehicle body and for causing said cylinder to push the piston rod out in order to make said pressure means press the protective molding after said pressure means has been moved backward.

17. An apparatus according to claim 16 further comprises movement adjusting means incorporated with said backward driving means and operative to keep a movement of said pressure means toward the vehicle body at a relatively low moving speed during a period of time in which said control means actuates said forward driving means to cause the pressure means to contact the vehicle body.

18. An apparatus for fixing a protective molding at a vehicle body, the apparatus comprising:
pressure means for coming into contact with the protective molding attached temporarily to a side portion of the vehicle body to press the protective molding against the vehicle body when the vehicle body is conveyed along a predetermined path,
backward driving means for causing said pressure means to make a backward movement in relation to the vehicle body,
forward driving means for causing said pressure means to contact and press the protective molding,
body detecting means provided to accompany with said pressure means for coming into contact with the vehicle body before said pressure means contacts the vehicle body,
control means for actuating said backward driving means to move said pressure means backward when said body detecting means comes into contact with the vehicle body and then actuating said forward driving means to cause said pressure means which has been moved backward by said backward driving means to contact the vehicle body and press the protective molding attached temporarily to the side portion of the vehicle body against the vehicle body,
wherein said pressure means comprises an arm member supported by a fixed support to be movable forward and backward in relation to the vehicle body and a pressure roller attached to be rotatable to one end portion of said arm member for pressing the protective molding, said backward driving means comprises a cylinder supported by the fixed support and having a piston rod coupled at its one end with said one end portion of said arm member and a throttle valve device provided for supplying said cylinder with operating fluid so as to cause the piston rod to move at a relatively slow speed when said cylinder pushes the piston rod out, said forward driving means comprises a weight connected through a wire to said arm member and at least one pulley mounted on the fixed support for engaging said wire, said body detecting means comprises a roller supporting member attached to be movable rotatably to said one end portion of said arm member and a guide roller supported to be rotatable freely by said roller supporting member, and said control means comprises a switching valve device operative to change a valve position therein for causing said cylinder to pull the piston rod back in order to move said pressure roller backward when said guide roller comes into contact with the vehicle body and for causing said cylinder to push the piston rod out in order to make said pressure roller press the protective molding after said pressure roller has been moved backward.

19. An apparatus for fixing a protective molding to a vehicle body comprises:
pressure means for coding into contact with the protective molding attached temporarily to a side portion of the vehicle body to press the protective molding against the vehicle body when the vehicle body is conveyed along a predetermined path wherein said pressure means comprises an arm member supported by a fixed support to be movable forward and backward in relation to the vehicle body and a pressure roller attached to be rotatable to one end portion of said arm member for pressing the protective molding,
backward driving means for causing said pressure means including said arm member and said pressure roller to make a backward movement in relation to the vehicle body,
forward driving means for causing said pressure roller to contact and press the protective molding,
body detecting means provided to accompany with said pressure means for coming into contact with the vehicle body, and
control means for actuating said backward driving means to move said arm member and pressure roller backward when said body detecting means comes into contact with the vehicle body and then actuating said forward driving means to cause said pressure roller which has been moved backward by said backward driving means to contact the vehicle body an press the protective molding attached temporarily to the side portion of the vehicle body against the vehicle body
whereby the strength of said arm member may be increased due to the backward movement of the arm member and pressure roller in relation to the vehicle body, the increased strength of the arm member enabling said pressure roller to apply increased pressure to the protective molding and thus more securely attach the protective molding to the vehicle body.

* * * * *